(12) United States Patent
Jokschas et al.

(10) Patent No.: US 8,764,983 B2
(45) Date of Patent: Jul. 1, 2014

(54) FILTER ELEMENT AND FILTER MODULE

(75) Inventors: Günter Jokschas, Murrhardt (DE); Sven Epli, Heilbronn (DE); Alfons-Alois Schwinghammer, Dingolfing (DE)

(73) Assignee: Mann+Hummel GmbH, Ludwigsburg (DE)

( * ) Notice: Subject to any disclaimer, the term of this patent is extended or adjusted under 35 U.S.C. 154(b) by 129 days.

(21) Appl. No.: 13/182,199

(22) Filed: Jul. 13, 2011

(65) Prior Publication Data

US 2012/0012513 A1 Jan. 19, 2012

(30) Foreign Application Priority Data

Jul. 14, 2010 (DE) .......................... 10 2010 027 150

(51) Int. Cl.
  *B01D 29/50* (2006.01)
  *B01D 29/54* (2006.01)
  *B01D 29/58* (2006.01)
  B01D 35/30 (2006.01)

(52) U.S. Cl.
  USPC ...................... 210/323.2; 210/232; 210/323.1; 210/335; 210/435; 210/437; 210/438; 210/440; 210/441; 210/443; 210/450; 210/452; 210/457

(58) Field of Classification Search
  None
  See application file for complete search history.

(56) References Cited

U.S. PATENT DOCUMENTS

| 4,536,291 | A  | * | 8/1985 | Hoffmann et al. | 210/457 |
| 6,391,193 | B1 | * | 5/2002 | Luka | 210/130 |
| 7,513,373 | B2 | * | 4/2009 | Kramer | 210/440 |

FOREIGN PATENT DOCUMENTS

| DE | 2718815 A1 | 11/1978 |
| DE | 4311710 A1 | 10/1993 |
| DE | 10348301 A1 | 5/2005 |
| DE | 202007012691 U1 | 2/2009 |

OTHER PUBLICATIONS

DPMA search report on priority application DE 10 2010 027 150.0 dated Jul. 1, 2011.

\* cited by examiner

*Primary Examiner* — Benjamin Kurtz
(74) *Attorney, Agent, or Firm* — James Hasselbeck

(57) ABSTRACT

A filter element of a filter system for filtering fluids has a filter medium with end faces. Terminal bodies, one each, are connected to one of the end faces of the filter medium, respectively. A support body extends between the terminal bodies. A first terminal body is connected by a toothed connection to the support body for transmitting a torque from the first terminal body onto the support body and from the support body onto the first terminal body.

3 Claims, 8 Drawing Sheets

FILTER ELEMENT AND FILTER MODULE

CROSS REFERENCE TO RELATED APPLICATIONS

This application claims the benefit under 35 USC 119 of foreign application 10 2010 027 150.09 filed in Germany on Jul. 14, 2010, and which is hereby incorporated by reference in its entirety.

TECHNICAL FIELD

The invention relates to a filter element of a filter system for filtering fluids, in particular fuel, oil, water or air, in particular of a motor vehicle. Moreover, the invention relates to a filter module of a filter system for filtering fluids, in particular fuel, oil, water or air, in particular of a motor vehicle comprises at least two filter elements each having a filter medium that is in particular folded in a star shape in preferably coaxial form provided at each end face with a terminal body, wherein the filter elements are arranged in tandem in axial direction.

BACKGROUND OF THE INVENTION

Filter elements or filter modules over the aforementioned type are mounted in filter housings of filter systems that are provided for filtering gaseous or liquid fluids. In motor vehicles and industrial motors such filter systems are employed for filtering in particular fuel, preferably diesel fuel or gasoline, motor oil or combustion air or compressed air. Such filter elements or filter modules can be used also in water technology.

In a commercially available filter element the end faces of a filter medium that is folded in a star shape are provided each with a terminal body in the form of an end disk of plastic material welded or fused to the end faces. A support tube extends between the two end disks. Over time, between a connecting flange of the filter housing and the corresponding end disk of the filter element deposits can form or the parts may stick or adhere to each other because of sticky residues causing the filter element to be stuck within the filter housing. When removing the filter element from the filter housing it is therefore advantageous to rotate the filter element in the filter housing about an axis that extends in the direction of the support pipe. In this way, deposits or sticky residues causing the parts to stick can be easily removed, and this facilitates removal of the filter element. For rotation, torque is applied on the free end disk that is facing the connecting flange. This torque is introduced into the filter element which causes loading of the latter or of the fused connection with the end disk. In case the other end disk does not immediately become detached from the connecting flange, the two end disks are rotated or twisted relative to each other. As a result, because of mechanical loading, the filter medium can be torn off the end disks or can become damaged in other ways by torsion.

It is therefore an object of the present invention to provide a filter element and a filter module of the aforementioned kind such that torque can be transmitted from one of the terminal bodies onto the other terminal body while the filter medium is to be loaded as little as possible when doing so.

SUMMARY OF THE INVENTION

In accordance with the present invention, this is achieved in that at least one of the terminal bodies is connected by a toothing with the support body for transmitting torque from the terminal body onto the support body and vice versa.

According to the invention, a toothing is thus provided that transmits torque, applied from the exterior onto the corresponding terminal body, by form fit (positive lock) into the support body. From the support body the torque is then transmitted further by a suitable connection that may also compromise a toothed connection to the other terminal body. When doing so, the filter medium is therefore not subjected to any load or, in comparison to filter elements of the prior art, only exposed to a significantly reduced mechanical load. For mounting the filter element the support body is connected to one of the terminal bodies. The filter medium is pushed on from the exposed side of the support body. Subsequently, the other terminal body is connected with generation of a toothed connection to the support body. Advantageously, the support body may be arranged within the filter medium or outside of the filter medium. It is possible to provide a support body on the interior as well as on the exterior. Within the filter medium the support body can be configured as a support tube that delimits the interior of the filter medium and stabilizes the filter medium in radial direction inwardly. External to the filter medium the support body can be realized as an outer wall that stabilizes the filter medium in radial direction outwardly. The support body can be permeable in radial direction for the fluid.

In an advantageous embodiment, the support body can have on the end face that is facing the at least one terminal body a toothed crown and the at least one terminal body can be provided on the side that is facing the support body with a matching toothed counter crown that engages the toothed crown provided on the terminal body. In this way, the terminal body can be pushed simply onto the support body or inserted into it with the toothed crown and the toothed counter crown being inserted into each other. In this way, a detachable connection between the terminal body and the support body can be realized. In contrast to fused (welded) connections, no additional tool is required. Moreover, no hardening of plastic material or adhesive, as in known adhesive or fused connections, is required so that the production time is significantly shortened.

In a further advantageous embodiment, the teeth of the toothed crown and/or of the toothed counter crown can taper to a pointed shape at the end face that is facing the respective opposed crown. In this way, the teeth can glide easily across each other upon mutual insertion. In this way, a position-independent mounting of the terminal bodies of the filter element can be realized.

In another advantageous embodiment, the support body at the end face that is facing the at least one terminal body or the terminal body at the face that is facing the support body can have a toothed crown that is impressed into a side of the terminal body or the end face of the support body that has been softened by a softening process and thus impresses a structure within the terminal body or within the support body that, after hardening of the terminal body or of the support body, forms a toothed counter crown for the toothed crown of the support body or the terminal body. In this way, only on one component a toothed crown is required. It acts like an embossment punch for the toothed counter crown that is formed upon impression into the softened material of the opposed component, respectively. In this way, a stable form-fit toothed connection between the terminal body and support body is achieved.

In order to enhance the stability of the toothed connection between the support body and the terminal body, the toothed crown can have a segmented undercut. The softened material can flow into the undercut and can harden therein so that the stability of the toothed connection, in particular relative to axial pulling loads, is increased.

Advantageously, the support body can be connected preferably monolithically with the terminal body which with it is not connected by a toothed connection. In this way, the support body and this terminal body can be produced simply and of a stable and strong configuration. When mounting the filter element, the filter medium can be simply pushed on or inserted from the free end face of the support body.

Moreover, the filter element advantageously can be a coalescing element. With the coalescing element in particular water can be separated simply from the fuel or motor oil.

The technical object is further solved according to the invention by the filter module that is characterized in that at least two of the terminal bodies are connected with form fit to each other by a toothed connection for transmitting torque directly or indirectly. Advantageously, one of the filter elements can be a coalescing element that is connected with a filter element of a different type of the filter module, in particular a fuel filter element, and is functionally arranged in serial connection (tandem arrangement). In this way, torque that is introduced through one of the axial outer terminal bodies of the filter module can be transmitted to the other terminal bodies without the filter media during this action being mechanically loaded to a level that could cause them to be damaged. The filter module can therefore be rotated for removal from a filter housing against a mechanical resistance in order to remove or loosen possibly existing deposits or sticky residues causing sticking between the filter module and the filter housing. In other respects, the aforementioned advantages of the filter element according to the invention also apply to the filter module of the present invention.

In a further advantageous embodiment, at least one of the terminal bodies can be interlocked by a toothed connection with at least one support body that extends between the two terminal bodies of one of the filter elements for transmitting a torque from the terminal body onto the support body and vice versa.

In a further advantageous embodiment, one of the terminal bodies of one of the filter elements can be interlocked by a toothed connection with the adjoining terminal body of the other filter element. In this way, torque can be transmitted between the two filter elements.

Advantageously, one of the terminal bodies of one of the filter elements can be interlocked by a toothed connection with the adjoining terminal body of the other filter element by means of a snap connection. The snap connection has the advantage that in radial and circumferential direction it has play that suffices for compensation of manufacturing tolerances. In this connection, the two terminal bodies are pressed against each other axially with minimal axial play. Upon axial compression a sealing action between the terminal bodies is realized.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

In the Figures same components are identified with same reference characters.

Figure 1:
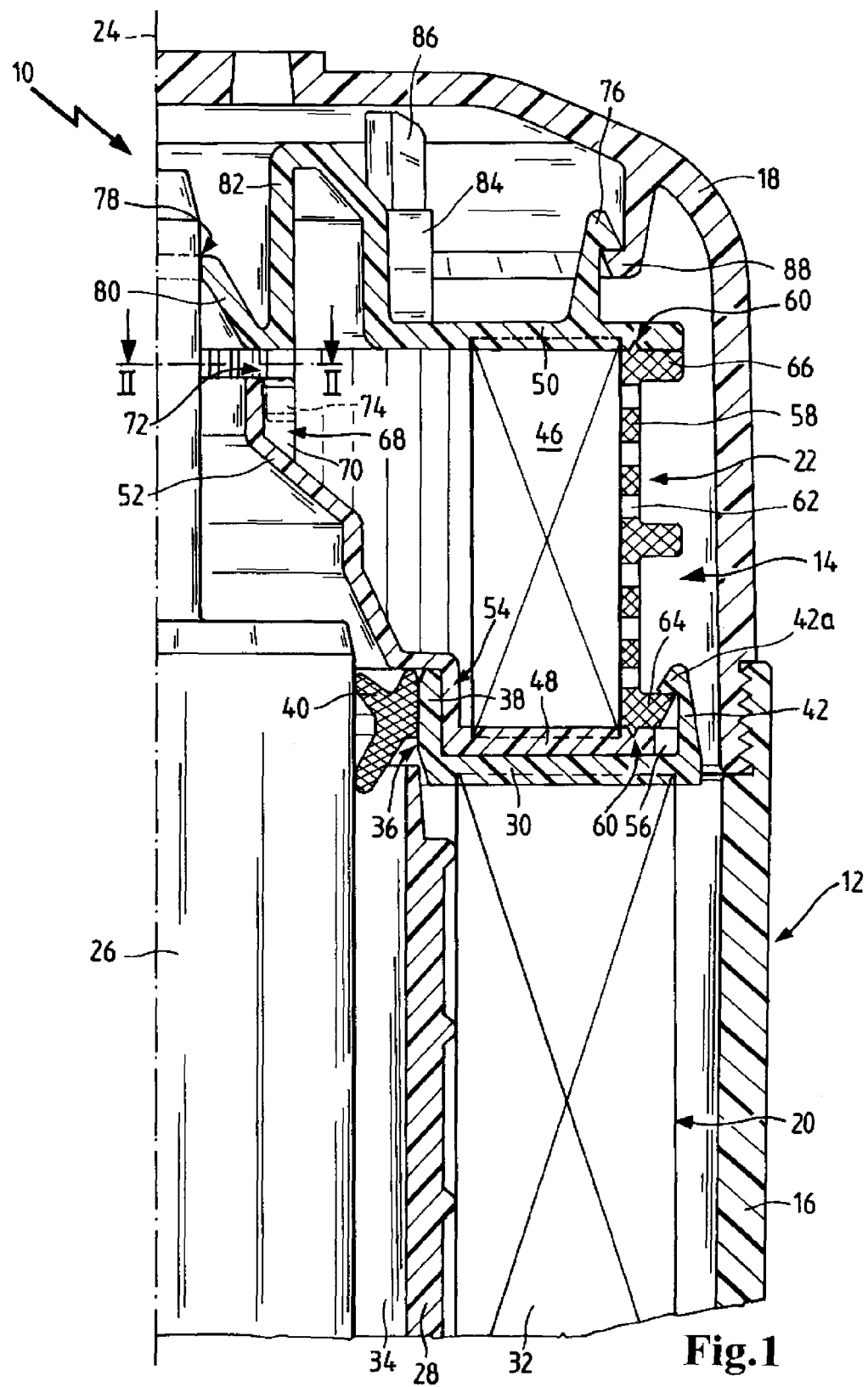
FIG. 1 shows schematically a detail of a filter system for fuel of an internal combustion engine in partial section view with a filter module according to a first embodiment in which a coupling end disk of a coalescing element is in toothed connection with a truncated cone shaped hollow support and with an outer wall and wherein a connecting end disk of the coalescing element is in toothed connection with a connecting end disk of a fuel filter element.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter element or a filter module.

Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In FIG. 1 in partial section a detail of one half of a filter system 10 for filtering liquid fuel of an internal combustion engine, not illustrated, of a motor vehicle is shown.

The filter system 10 comprises a filter housing 12 in which a filter module 14 according to a first embodiment is arranged so to be exchangeable. The filter housing 12 has connecting conduits (not important in connection with the invention) to a fuel line of the internal combustion engine.

The filter housing 12 comprises a housing cup 16 into which a housing cover 18 is screwed.

The filter module 14 comprises a round fuel filter element 20, shown in FIG. 1 at the bottom, and a coalescing element 22 in the form of a round filter element at the top. The fuel filter element 20 and the coalescing element 22 are arranged coaxially and successively (in tandem) relative to axis 24. The filter module 14 in axial direction is pushed onto a central tube 26 of the filter housing 12 that is coaxial to the axis 24. The central tube 26 is attached to a coupling flange, not illustrated, at the bottom of the filter housing 12. In the central tube 26 various fuel passages, not illustrated, extend in axial direction.

A skeleton-like filter support tube 28 of the fuel filter element 20 extends between a filter end disk, not shown, and a filter connecting end disk 30. The filter end disk is arranged on the side that is facing the coupling flange of the filter housing 12. The filter connecting end disk 30 is located at the end face of the filter support tube 28 that is facing away from the coupling flange. The filter support tube 28 is surrounded by a fuel filter medium 32 which is comprised of a nonwoven material that is folded in a star shape. The filter support tube 28 delimits an interior 34 of the fuel filter medium 32. The end faces of the filter medium 32 are fused (welded) to the filter end disk and the filter connecting end disk 30.

The filter connecting end disk 30 has a concentric opening 36 relative to the filter support tube 28. Also, the filter end disk has a concentric opening relative to the filter support tube 28. The filter connecting end disk 30 has inwardly in radial direction a hollow-cylindrical connecting socket 38 that surrounds the opening 36 and extends in axial direction away from the axial outer base surface of the filter connecting end disk 30.

On the inner side of the connecting socket 38 an elastic sealing ring 40 is arranged which serves for sealing the central tube 26 relative to the connecting socket 38.

The filter connecting end disk 30 comprises a plurality of filter locking hooks 42 distributed circumferentially on the radial outer side for securing the coalescing element 22. One of the filter locking hooks 42 is shown in detail in FIG. 3. The filter locking hooks 42 extends away from the axial outer base surface of the filter connecting end disk 30 in axial direction wherein locking sides 43 of the filter locking hooks 42 are arranged inwardly in radial direction. The filter locking hooks 42 taper to a pointed shape at their free ends at their locking sides 43; this configuration facilitates connection with the coalescing element 22.

Figure 3:
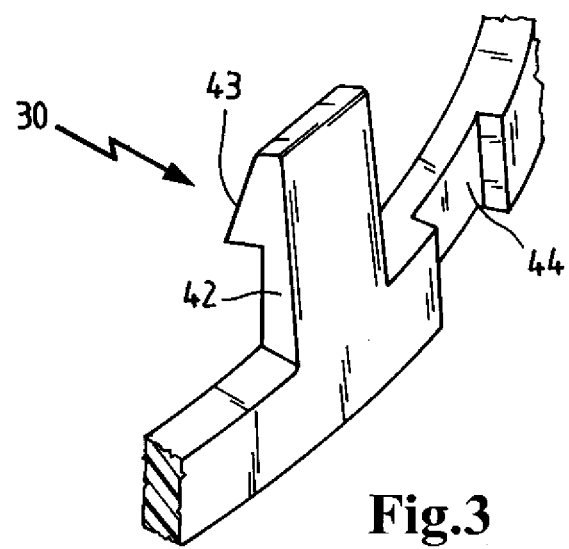
FIG. 3 shows schematically an isometric detail view of the connecting end disk of the fuel filter element of the filter module of FIG. 1.

The circumferential side of the filter connecting end disk 30 has between the filter locking hooks 42 angular filter recesses 44 that are arranged in a toothed crown shape. One of the filter recesses 44 is illustrated in FIG. 3.

The connecting socket 38, the filter locking hooks 42, and the filter recesses 44 serve for coupling the coalescing element 22.

The coalescing element 22 has the function of improving separation of water droplets from the fuel and is arranged in the inflow area of the fuel; in FIG. 1 this is the upper area of the filter housing 12.

The coalescing element 22 comprises a star-shaped folded coalescing filter medium 46 of coaxial form. On the end face of the coalescing filter medium 46 that is facing the fuel filter element 20 a coalescing connecting end disk 48 is connected by welding (fusing). On the other end face a coupling end disk 50 is connected by fusing (welding). On the base surface of the coalescing connecting end disk 48 that is facing away from the fuel filter element 20 a truncated cone shaped hollow support 52 is formed integrally (monolithically). The truncated cone shaped hollow support 52 extends coaxially to the axis 24 in axial direction up to a location immediately before the coupling end disk 50 and is open at both base faces. The wall of the truncated cone shaped hollow support 52 is of a multi-step configuration. Near the base face that is facing the fuel filter element 20 the wall of the truncated cone shaped hollow support 52 has a cylindrical insertion section 54 into which the connecting socket 38 of the filter connecting end disk 30 of the fuel filter element 20 is inserted when the filter module 14 is assembled. Because of the funnel-shaped geometries of the truncated cone shaped hollow support 52 and of a central section 80 of the coupling end disk 50, to be explained in detail in the following, the insertion of the connecting socket 38 upon assembly of the fuel filter element 20 and of the coalescing element 22 is facilitated.

The coalescing connecting end disk 48 has in radial direction outwardly a plurality of angular projections distributed about the circumference; these projections are hidden in the view of FIG. 1 and therefore not shown. The angular projections extend on the axial outer base surface in a crown shape in axial direction. The angular projections are complementary to the angular filter recesses 44 of the filter connecting end disk 30. When the filter module 14 is mounted, the angular projections engage with form fit the angular filter recesses 44 so that a meshing toothed connection between the coalescing connecting end disk 48 and the filter connecting end disk 30 is realized for transmitting torque between the two connecting end disks 30 and 48.

In circumferential direction between the angular projections the circumferential side of the coalescing connecting end disk 48 is provided with notches 56 through which the filter looking hooks 42 of the filter connecting end disk 30 pass. FIG. 1 shows one of the notches 56. The notches 56 extend in radial direction so far inwardly that the filter looking hooks 42 cannot hook or lock on their radially inwardly positioned edges.

Between the coalescing connecting end disk 48 and coupling end disk 50 an outer wall 58 extends coaxially to the axis 24. This wall 58 surrounds in radial outward direction the coalescing filter element 46 and supports it. On its end faces the outer wall 58 is fused with the respective base surface of the coalescing connecting end disk 48 and the coupling end disk 50. The end faces of the outer wall 58 have a plurality of webs 60 arranged in a toothed crown shape and extending in circumferential direction and in axial direction. When fusing the components, the webs 60 are pressed like an embossment into the softened surfaces of the coalescing connecting end disk 48 and the coupling end disk 50. After hardening, a toothed connection is formed in this way which improves the transmission of torque between the coupling end disk 50 and the outer wall 58 and between the outer wall 58 and the coalescing connecting end disk 48.

The outer wall 58 has moreover a plurality of through openings 62 through which fuel can pass through the outer wall 58 in radial direction.

The outer wall 58 is provided on its end face that is facing the fuel filter element 20 with a connecting collar 64 and on the end face that is facing the housing cover 18 with a coupling collar 66 that extend radially in outward direction. The connecting collar 64 is beveled circumferentially at the side that is facing the fuel filter element 20. During assembly of the filter module 14, on the bevel the slanted locking sides 43 of the filter locking hooks 42 of the filter connecting end disk 30 are guided. Assembly is facilitated in this way. In the mounted state, the filter locking hooks 42 lock or snap on the side of the connecting collar 64 that is positioned remote from the filter connecting end disk 30.

The filter connecting end disk 30, the filter end disk, the filter support tube 28, the coalescing connecting end disk 48, the coupling end disk 50, the truncated cone shaped hollow support 52 and the outer wall 58 are made of plastic material. Plastic material is lightweight, can be shaped in a simple way to complex shapes, and can be recycled in a simple and inexpensive way.

Figure 2:
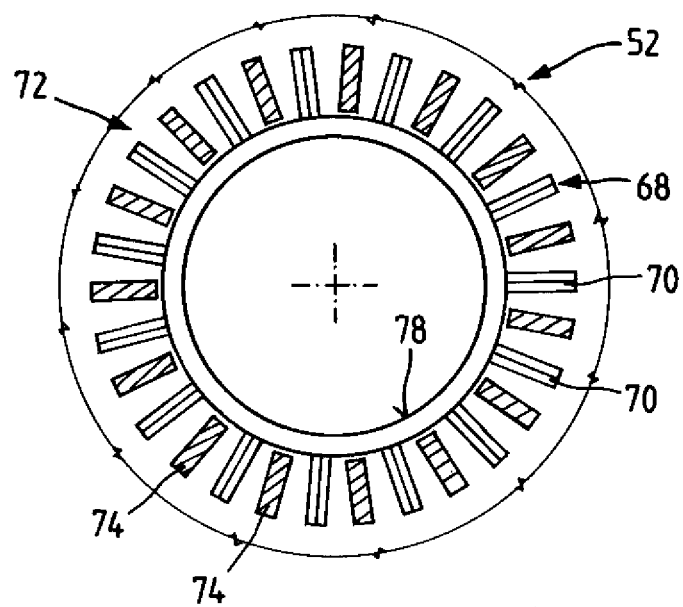
FIG. 2 shows schematically a cross-section of the coalescing element of FIG. 1 along the section line II-II of FIG. 1 in the area of the toothed connection of the coupling end disk with the truncated cone shaped hollow support.

The truncated cone shaped hollow support 52 has on its small base side that is facing the coupling end disk 50 a monolithically formed toothed collar 68 whose teeth 70 extend in radial direction and in axial direction toward the coupling end disk 50. On the coupling end disk 50 an complementary toothed counter crown 72 is formed monolithically having teeth 74 that extend in radial direction and in axial direction toward the truncated cone shaped hollow support 52. When the coalescing element 22 is in the mounted state, the teeth 70 of the toothed crown 68 engage positively between the teeth 74 of the toothed counter crown 72 so that in this way a toothed connection for transmitting torque from the coupling end disk 50 through the truncated cone shaped hollow support 52 onto the coalescing connecting end disk 48 is realized. In FIG. 2, a transverse cross-section of the coalescing element 22 in the area of the toothed counter crown 72 in a viewing direction axially onto the toothed crown 68 of the support cone 52 is illustrated.

The teeth 70 of the toothed crown 68 and the teeth 74 of the toothed counter crown 72 taper in a pointed shape at their end faces that are facing the opposed toothed crown 68 or 72, respectively. When combining the coupling end disk 50 and the support cone 52 of the coalescing connecting end disk 48 in axial direction, the pointedly shaped end faces of the teeth 70 and 74 glide across each other. In this way, mounting is facilitated without this requiring an additional positional pre-determination of the coupling end disk 50 relative to the coalescing connecting end disk 48.

The coupling end disk 50 has a plurality of coupling locking hooks 76 that are distributed circumferentially about a coaxial circular path that is coaxial to the axis 24. The coupling locking hooks 76 serve for connecting the coalescing element 22 with the housing cover 18 of the filter housing 12. The coupling locking hooks 76 extend on the axial outer base surface facing away from the coalescing filter medium 46 in axial direction wherein locking sides of the coupling locking hooks 76 are positioned in radial direction outwardly. The connecting locking hooks 76 are tapering to a pointed shape at their free end on the respective locking side; this facilitates the connecting action with the housing cover 18.

The coupling end disk 50 has a coaxial opening 78 relative to the axis 24 through which the center tube 26 is passed. An area of the coupling end disk 50 that surrounds the opening 78 is in cross-section approximately curved in an S-shape. A central section 80 of this area that surrounds immediately the opening 78 is shaped like a truncated cone wall whose large base surface is facing the coalescing filter medium 46. The radial inner rim of the coupling end disk 50, opening 78, located at the small base surface of the truncated cone wall, is positioned against the circumferential side of the central tube 26. Radially outside of the central section 80 a bead section 82 adjoins and extends in axial direction away from the coalescing filter medium 46. The side of the bead section 82 that is facing away from the coalescing filter medium 46 is slanted in radial outward direction.

In radial direction outside of the bead section 82 a stop web 84 is monolithically formed on the side of the coupling end disk 50 that is facing away from the coalescing filter medium 46. The stop web 84 extends in radial and axial direction. The stop web 84 serves upon rotational movement of the housing cover 18 relative to the coupling end disk 15 as a stop for a follower web 86 that is formed monolithically in the housing cover 18. The follower web 86 extends in axial and radial direction. The free end face of the connecting web 84 that is facing away from the coalescing filter medium 46 and the free end face that is facing the coupling end disk 50 of the follower web 86 taper to form a pointed shape. In this way, the follower web 86 and the stop web 84 can glide past each other in case that their end faces upon pushing on the housing cover 18 contact each other in axial direction. In this way, a separate positioning predetermination can be avoided.

On the inner side of the housing cover 18 there is moreover an annular locking projection 88 which in the mounted state in radial outward direction surrounds the locking hooks 76 of the coupling end disk 50. The side of locking projection 88 facing the coalescing element 22 is curved inwardly in radial direction and serves as a locking bearing for the locking hooks 76 of the coupling end disk 50.

For producing the coalescing element 22 first the coupling end disk 50, the coalescing connecting end disk 48 with the truncated cone shaped hollow support 52 and the outer wall 58 are first manufactured as separate components from plastic material. The coalescing filter medium 46 is folded from nonwoven material.

The sides of coalescing connecting end disk 48 facing the coalescing filter medium 46 and the coupling end disk 50 are softened by means of hot-shoe welding. The coalescing filter medium 46 and the outer wall 58 are inserted in axial direction onto the truncated cone shaped hollow support 52.

The coupling end disk 50 in axial direction is pushed against the free end faces of the coalescing filter medium 46 and the outer wall 58. When doing so, the teeth 74 of the toothed counter crown 72 glide between the teeth 70 of the toothed crown 68 and in this way form the toothed connection that serves also as a guiding means. A precise positioning of the coupling end disk 50 in circumferential direction relative to the axis 24 and relative to the coalescing connecting end disk 48 is not required. The end faces of the coalescing filter medium 46 and the outer wall 58 are pressed upon joining into the respective still soft surfaces of the coupling end disk 50 and of the coalescing connecting end disk 48. The webs 60 of the outer wall 58 impress complementary recesses into the coupling end disk 50 and the coalescing connecting end disk 48; upon hardening, the recesses form together with the webs 60 the toothed connection. By means of the toothed connection of the toothed crown 68 with the toothed counter crown 72 and the toothed connections of the webs 60 of the outer wall 58 with the coupling end disk 50 and the coalescing connecting end disk 48 the coupling end disk 50 is connected positively (form fit) and indirectly with the coalescing connecting end disk 48.

For mounting the fuel filter element 20 the filter end disk, the filter connecting end disk 30, and the filter support tube 28 are first premanufactured as separate parts from plastic material. The fuel filter medium 32 is folded from nonwoven material.

The filter support tube 28 is connected fixedly with the filter end disk.

The sides of the filter end disk that are facing the fuel filter medium 32 and the filter connecting end disk 30 are softened by means of hot-shoe welding.

The fuel filter medium 32 is pushed in axial direction onto the filter support tube 28.

The filter connecting end disk 30 is pushed in axial direction onto the still exposed end face of the fuel filter medium 32. Upon joining, the end faces of the fuel filter medium 32 are pushed into the respective still soft surfaces of the filter end disk and the filter connecting end disk 30.

After hardening of the surfaces of the coupling end disk 50, the coalescing connecting end disk 48, the filter connecting end disk 30, and the filter end disk, the assembly of the filter module 14 is carried out.

For this purpose, the coalescing element 22 is pushed in axial direction onto the fuel filter element 20. When doing so, the coalescing element 22 is rotated relative to the fuel filter element 20 about the axis 24 such that the positions of the filter locking hooks 42 of the filter connecting end disk 30 and the notches 56 of the coalescing connecting end disk 48 are aligned with each other and the projections of the coalescing connecting end disk 48 engage the filter recesses 44 of the filter connecting end disk 30 and form a toothed connection. By means of this toothed connection, the coalescing connecting end disk 48 and the filter connecting end disk 30 are positively (form-fittingly) directly connected with each other. The connecting socket 38 of the filter connecting end disk 30 glides upon joining into the insertion section 54 of the support cone 52 of the coalescing connecting end disk 48. In the end position, the filter locking hooks 42 that are guided upon joining with their slanted side along the ramp of the connecting collar 64 of the coalescing connecting end disk 48 lock or snap on the connecting collar 64.

For installing the finish-mounted filter module 14 in the filter housing 12, the housing cover 18 is pushed in axial direction onto the coalescing element 22. When doing so, the slanted sides of the locking hooks 76 of the coupling end disk 50 glide across the annular locking projection 88 of the housing cover 18 and lock thereat. In case that the stop web 84 contacts the follower web 86, the pointedly extending end faces of the stop web 84 and of the follower web 86 ensure that the housing cover 18 is rotated somewhat relative to the coalescing element 22 so that the stop web 84 and the follower web 86 can glide across each other.

The housing cover 18 and the filter module 14 are pushed with the fuel filter element 20 leading in axial direction onto the central tube 26 of the filter housing 12 and the housing cover 18 is screwed into the housing cup 16. Upon screwing in the housing cover 18, by means of the follower web 86 and the stop web 84 torque is introduced into the coupling end disk 50. The torque is transmitted by means of the toothed connection of the toothed counter crown 72 with the toothed crown 68 of the truncated cone shaped hollow support 52 and by means of the toothed connections of the coupling end disk 50 with the outer wall 58 and of the outer wall 58 with the coalescing connecting end disk 48 onto the coalescing connecting end disk 48. From here, the torque is transmitted through the toothed connection of the projections of the coalescing connecting end disk 48 with the filter recesses 44 of the filter connecting end disk 30 into the connecting end disk 30. From the filter connecting end disk 30 the torque is transmitted through the filter support tube 28 onto the filter end disk. As a whole, the entire filter module 14 with the housing cover 18 is rotated about axis 24 without the coalescing filter medium 46 and the fuel filter medium 30 being mechanically loaded.

For removing the filter module 14 the housing cover 18 is screwed out of the housing cup 16. When doing so, the housing cover 18 is rotated relative to the filter module 14 until the follower web 86 contacts the stop web 84 of the coupling end disk 50. From this moment on of the removal action, upon further rotation of the housing cover 18 torque is introduced into the filter module 14. The torque is transmitted to the filter end disk of the fuel filter element 20 in analogy to the above described installation of the filter module 14. The entire filter module 14 is rotated in the housing cup 16 about the axis 24. When doing so, deposits or a sticky residue causing the filter module 14 to stick to the coupling flange of the filter housing 12 are loosened or detached in a simple way; this facilitates removal of the filter module 14.

Figure 4:
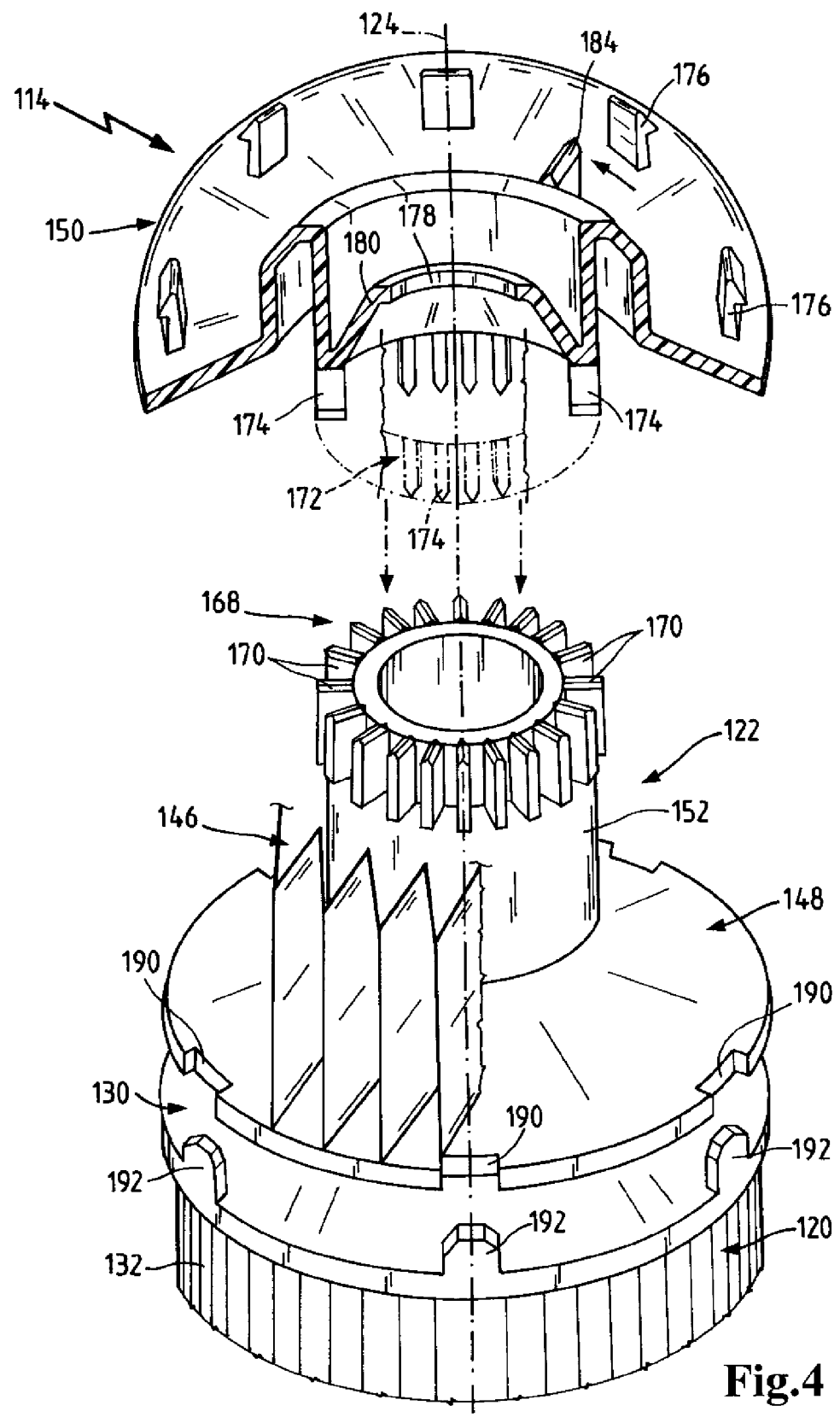
FIG. 4 schematically shows an exploded illustration of a filter module according to a second embodiment that is similar to the filter module of FIGS. 1 to 3, wherein the coupling end disk is shown in partial section view.

In a second embodiment of a filter module 114, illustrated in FIG. 4, those elements that are similar to those of the first embodiment illustrated in FIGS. 1 to 3 are identified with the same reference characters plus 100 so that with respect to their description reference is being had to the description of the first embodiment. The embodiment of FIG. 4 differs from the first one in that the coupling end disk 150 has no bead section. Moreover, instead of the angular projections as in the first embodiment angular depressions 190 are provided in the coalescing connecting end disk 148. The filter connecting end disk 130 has distributed circumferentially on the outer side in radial direction a plurality of angular projections 192 that match the recesses or depressions 190. The angular projections 192, for facilitating mounting and for an improved guiding in the depressions 190, are provided at their free end faces with a ramp. An outer wall and filter snap hooks, as provided in the first embodiment, are not provided.

Figure 5:
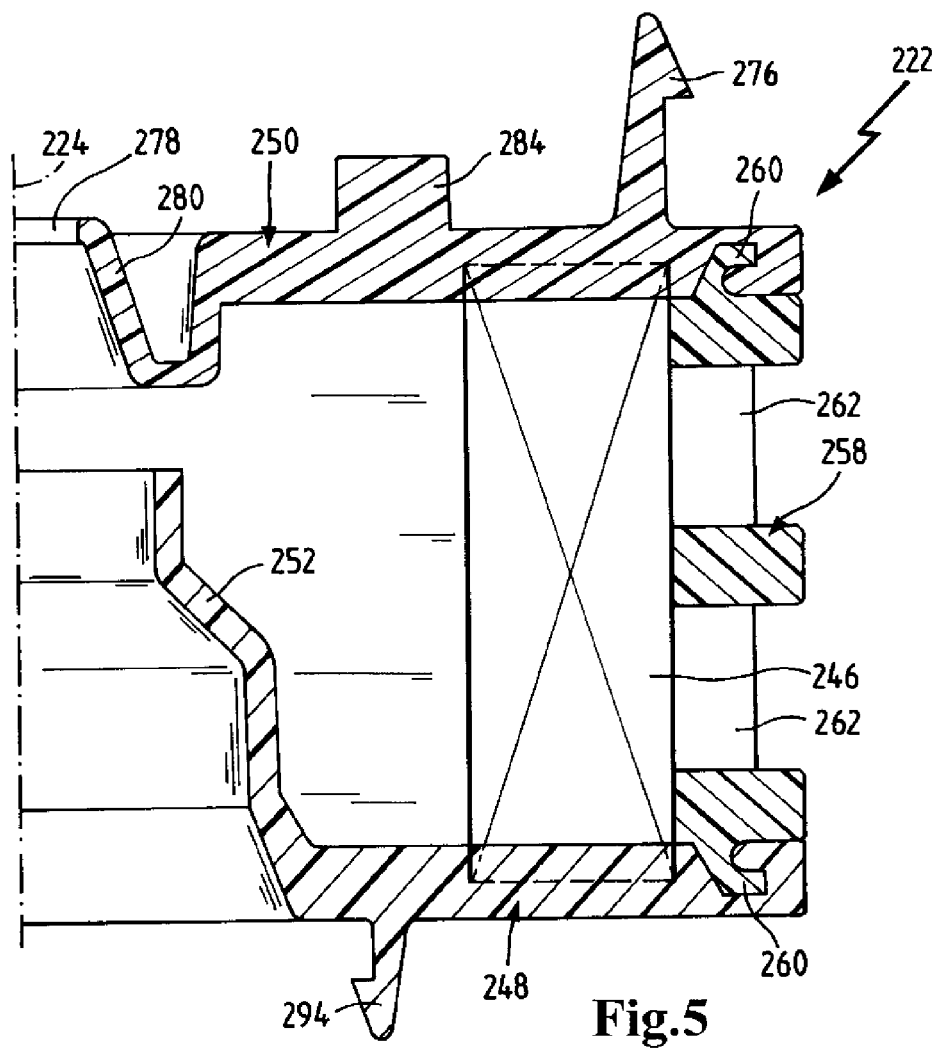
FIG. 5 shows schematically a section of a coalescing element of a filter module according to a third embodiment in which an outer wall is in toothed connection with the coupling end disk and the connecting end disk.
Figure 6:
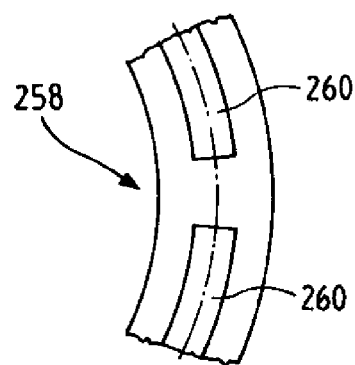
FIG. 6 shows schematically in plan view one of the end faces of the outer wall of the coalescing element of FIG. 5.

In a third embodiment, illustrated in FIGS. 5 and 6, those elements that are similar to those of the first embodiment disclosed in FIGS. 1 to 3 are identified with the same reference characters plus 200. In FIG. 5, a coalescing element 222 is shown that is similar to the coalescing element 22 of the first embodiment. In contrast to the first embodiment with the toothed crown arrangement of the straight webs 60, in the third embodiment the end faces of the outer wall 258 are provided with a segmented arrangement of webs 260 with undercuts. Two of the webs 260 at one of the end faces of the outer wall 258 are illustrated in plan view in FIG. 6. When pressing the webs 260 into the soft surfaces of the coalescing connecting end disk 248 and the connecting end disk 250, the softened material flows into the undercuts so that after hardening the stability of the toothed connection in particular in axial direction is improved. Moreover, the coupling end disk 250 of the third embodiment has no bead section in contrast to the first embodiment. Moreover, the coalescing connecting end disk 248 has no angular projections. Instead, connecting looking hooks 294 are provided on the outer side of the coalescing connecting end disk 248 that is facing away from the truncated cone shaped hollow support 352. The connecting looking hooks 294, when the filter module is mounted, lock on appropriate receptacles of the filter connecting end disk of the fuel filter element that is not shown in FIGS. 5 and 6.

Figure 12:
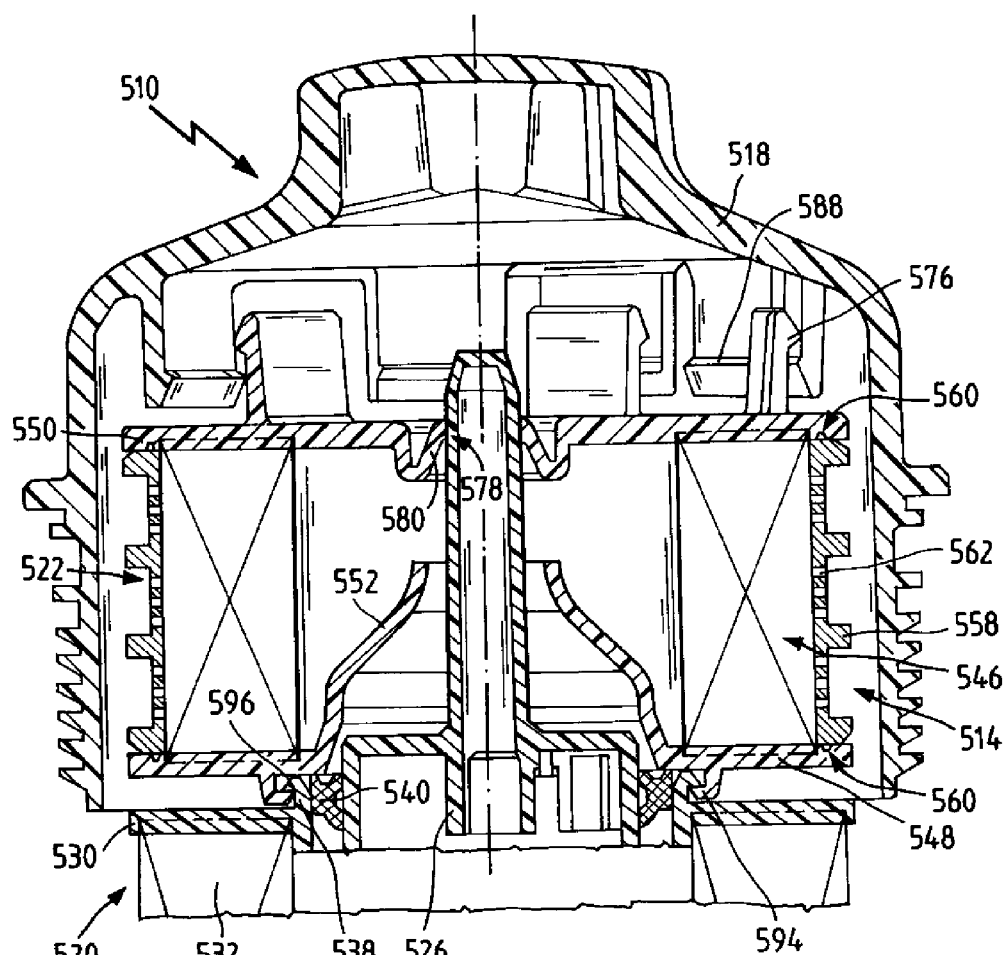
FIG. 12 shows schematically a detail of a filter system with a filter module according to a sixth embodiment which is similar to that of the filter system of FIG. 1.

In FIG. 12 a part of a filter system 510 with a filter module 514 according to a sixth embodiment is illustrated which is similar to the filter system according to the first embodiment of FIGS. 1 to 3. The filter module 514 comprises a coalescing element 522, similar to the coalescing element 222 according to the third embodiment described in connection with FIGS. 5 and 6, and a fuel filter element 520. Those elements that are similar to those of the first or the third embodiment are identified with the same reference characters plus 500 or plus 300. In contrast to the first embodiment, the connecting socket 538 of the filter connecting end disk 530 of the fuel filter element 520 is provided in radial outward direction with a locking collar 596 that is slanted toward the free end of the connecting socket 538. Behind the locking collar 596 the connecting looking hooks 594 of the coalescing connecting end disk 548 of the coalescing element 522 will lock or snap on in analogy to the third embodiment. In this way, a locking connection (snap connection) is realized that has play in radial and circumferential direction sufficient for compensating manufacturing tolerances. In this connection, the filter connecting end disk 530 and the coalescing connecting element 548 are pressed axially against each other with minimal axial play. With the axial compression a sealing action between the filter connecting end disk 530 and the coalescing connecting end disk 548 is realized.

Figure 7:
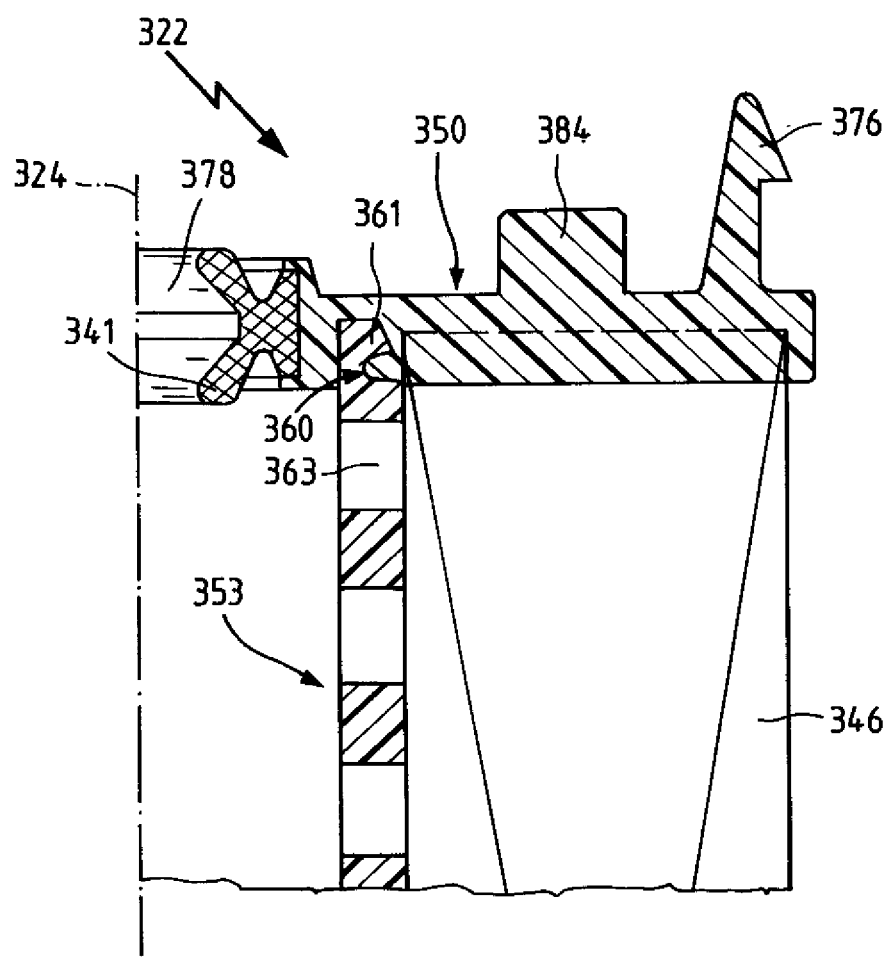
FIG. 7 shows schematically a section view of a fuel filter element of a filter module according to a fourth embodiment in which the coupling end disk of the coalescing element is in toothed connection with an inner support tube.

In FIG. 7 a coalescing element 322 of a fourth embodiment of an otherwise not-shown filter module is illustrated. Elements which are similar to those of the first embodiment described in connection with FIGS. 1 to 3 are identified with the same reference characters plus 300. In contrast to the first embodiment, a central support tube 353 is in toothed connection with the connecting end disk 350 by means of segmented webs 361 with undercuts 360. The segmented webs 361 act as a toothed collar that impresses the toothed counter collar into the softened material of the connecting end disk 350. The wall of the support tube 353 is provided with through openings 363 for the fuel. The area of the connecting end disk 350 that is neighboring the openings 378 extends planar. In the opening 378 an elastic sealing ring 341 is arranged for sealing relative to the central tube of the filter housing (not shown in FIG. 7).

Figure 8:
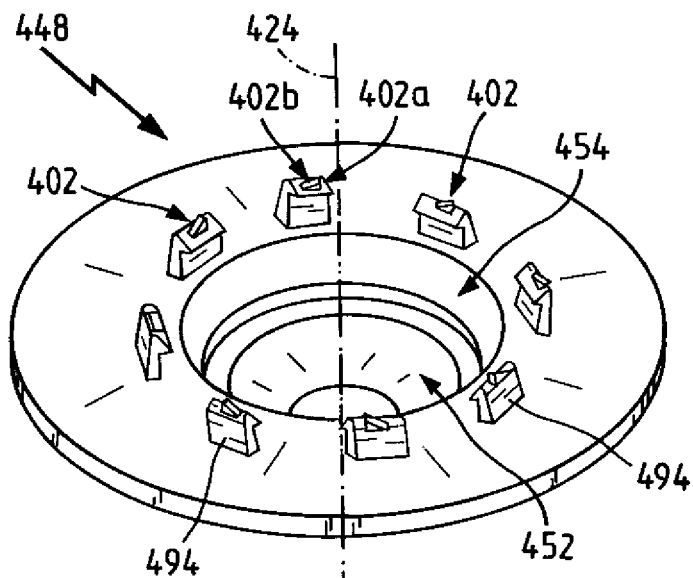
FIG. 8 shows schematically an isometric illustration of a connecting end disk of a coalescing element of a filter module according to a fifth embodiment in a viewing direction onto the side that faces a fuel filter element when the filter module is mounted.
Figure 9:
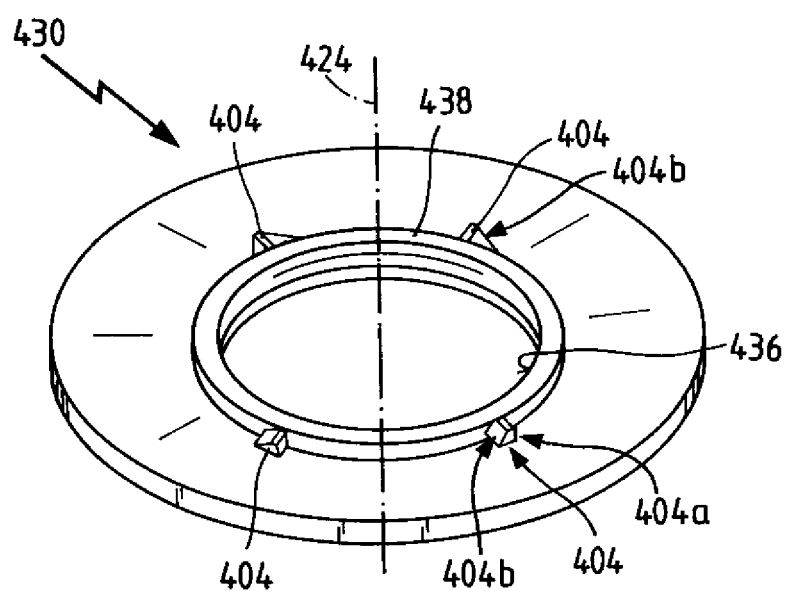
FIG. 9 shows schematically an isometric illustration of a connecting end disk of the fuel filter element of the filter module according to the fifth embodiment in a viewing direction onto the side that is facing in the mounted state of the filter module the connecting end disk of FIG. 8.
Figure 10:
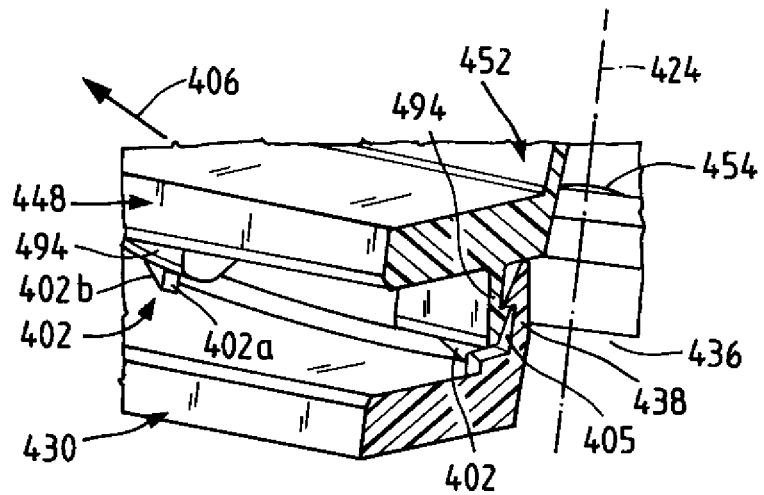
FIG. 10 shows schematically an isometric detail view of the two connecting end disks of FIGS. 8 and 9 in the mounted state.
Figure 11:
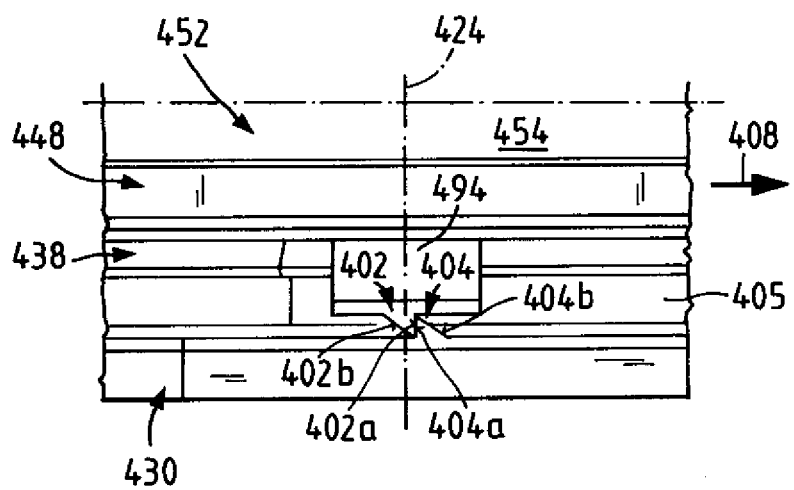
FIG. 11 shows schematically in detail a side view of the two connecting end disks of FIG. 10.

In FIGS. 8 to 11 a coalescing connecting end disk 48 and a filter connecting end disk 430 of a fifth embodiment of an otherwise not-shown filter module is illustrated. Elements that are similar to those of the first embodiment described in connection with FIGS. 1 to 3 are identified with the same reference characters plus 400. In FIG. 8, the coalescing connecting end disk 448 is shown in a viewing direction onto the side that is facing the filter connecting end disk 430. The coalescing connecting end disk 448 has, similar to the third embodiment of FIGS. 5 and 6, on the exterior side facing away from the support collar 452 a plurality of connecting looking hooks 494 that are arranged like a toothed crown along a coaxial circle that is coaxial to the axis 424. The connecting looking hooks 494 extend in axial direction. Locking sides of the connecting looking hooks 494 are located on the radial inner side which is facing the axis 424. The connecting looking hooks 494 are tapering on the locking sides to a pointed shape at their free ends. On the free end faces of the snap hooks 494 a rotary stop web 402 is provided monolithically. One or two of the rotary stop elements 402 are shown in FIGS. 10 and 11 in detail.

FIGS. 10 and 11 show detail views of the coalescing connecting end disk 448 and of the filter connecting end disk 130 in the mounted state in different perspectives. Each rotary stop element 402 has a stop side 402*a* that extends in a plane radially and axially to the axis 424. A ramp side 402*b* that is positioned opposite the stop side 402*a* extends at a slant relative to the stop side 402*a* in a plane that extends radially to the axis 424. Viewed in radial direction, the rotary stop elements 402 each have the shape of a right triangle that with one of its legs is positioned at the end face of the snap hook 494 while the other leg is positioned at the stop side 402*a* and its hypotenuse is positioned at the ramp side 402*b*.

FIG. 9 shows the filter connecting end disk 430 in a viewing direction on the side that is facing the coalescing connecting end disk 448. The connecting socket 438 of the filter connecting end disk 430 has its radial outer circumferential side an undercut 405 shown in FIG. 10. The undercut 405 serves as a receptacle in which the snap hooks 494 of the coalescing connecting end disk 448 lock in the mounted state of the filter module shown in FIGS. 10 and 11. The connecting socket 483 is slanted at its radial outer free rim. When pushing the coalescing element onto the fuel filter element in axial direction, the slanted sides of the snap hooks 494 glide across the slanted rim of the connecting socket 438. In this way a guiding action is achieved and mounting is facilitated.

Radially outside of the connecting socket 438 four rotary counter stop elements 404, in circumferential direction uniformly distributed, are monolithically attached to the base surface of the filter connecting end disk 430. The rotary counter stop elements 404 are configured similar to the rotary stop elements 402 on the coalescing connecting end disk 448.

Upon rotation of the coalescing element relative to the fuel filter element in the rotary direction of closing, indicated in FIG. 10 by arrow 406 that corresponds to the rotary direction upon screwing in the housing cover into the housing cup, the ramp sides 402*b* of the rotary stop elements 402 impact on the corresponding ramp sides 404*b* of the rotary counter stop elements 404 at the latest after a fragment of a revolution; this causes a recognizable mechanical resistance. Upon further rotation with increased force expenditure the rotary stop elements 402, as a result of a certain elasticity of the rotary stop elements 402 and of the rotary counter stop elements 404, glide across the rotary counter stop elements 404.

Upon rotation of the coalescing elements relative to the fuel filter element in reverse direction (rotary direction of opening), indicated in FIG. 11 by arrow 408 which corresponds to the rotary direction for opening the housing cover, the rotary stop elements 402, at the latest after a fragment of a revolution, will impact with their stop sides 402*a* on the corresponding counter stops sides 404*a* of the rotary counter stop elements 404. A further relative rotary movement in the opening direction 408 is then prevented.

The rotary stop elements 402 and the rotary counter stop elements 404 act in the opening direction 408 like a toothed connection and enable the introduction of torque between the coalescing connecting end disk 448 and the filter connecting end disk 430. In this way, upon unscrewing the housing cover, torque that is introduced by it is transmitted onto the fuel filter element so that a possibly existing sticking action between the filter end disk and the coupling flange of the filter housing is loosened or overcome.

In the rotary closing direction 406 the rotary stop elements 402 and the rotary counter stop elements 404 interact like a slip clutch. Such a slip clutch enables further rotation but indicates that the mounting position of the filter module is reached by means of increased mechanical resistance and optionally an acoustic signal that is the result of snapping back of the rotary stop elements 402 and of the rotary counter stop elements 404.

In all of the above described embodiments of a filter module 14; 114; 514 the following modifications are possible.

The invention is not limited to filter systems 10; 510 for filtering liquid fuels. Instead, it can also be used in filter systems 10; 510 of a different type; filter modules 14; 114; 514; and filter elements 20, 22; 120, 122; 222; 322; 520, 522 for filtering other types of fluids, for example, oil, air or water. The use is not limited to the automotive field. The invention can be used, for example, also in industrial systems, for example, industrial motors or in water technology.

Instead of the filter module 14; 114; 514, the invention can also be used on individual filter elements 20, 22; 120, 122; 222; 322; 520, 522.

The fuel filter medium 32; 132; 532 and/or the coalescing filter medium 46; 146; 246; 346; 546 can be folded instead of in a star shape also in other ways, also other than coaxial.

The coupling end disk 50; 150; 250; 350; 550; the coalescing connecting end disk 48; 148; 248; 448; 548; the filter connecting end disk 30; 130: 430; 530; and/or the filter end disk can be realized by other, in particular differently shaped, terminal bodies.

The webs 60; 260; 361; 560 can be arranged, instead of on the end faces of the outer wall 58; 258; 558 or the support tube 361, also on the surfaces of the coalescing connecting end disk 48; 248; 548 or the coupling end disk 50; 250; 350; 550. For joining, the end faces of the outer wall or of the support tube can be softened and the webs of the coalescing connecting end disk 48; 248; 548 or of the coupling end disk 50; 53; 250; 550 can be impressed into them.

Instead of being fused to the filter end disk, the filter connecting end disk 30; 130; 430; 530; the coalescing connecting end disk 48; 148; 248; 448; 548 or the coupling end disk 50; 150; 250; 350; 550, the end faces of the fuel filter medium 32; 132; 532 and/or of the coalescing filter medium 46; 146; 246; 346; 546 can be joined also in other ways thereto, for example, adhesively connected.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter module of a filter system for filtering fluids, the filter module comprising:
   at least two filter elements, said filter elements each comprising:
      a filter medium having end faces,
      terminal bodies, one each connected to one of said end faces of said filter medium; and
      a support body extending between said terminal bodies in an axial direction;
   wherein said at least two filter elements are arranged in tandem in said axial direction;
   wherein a first one and a second one of said terminal bodies are connected by a first toothed connection to each other directly or indirectly by form fit for transmitting a torque;
   wherein said first terminal body belongs to a first one of said at least two filter elements and said second terminal body belongs to a second one of said at least two filter elements;
   wherein said first and second terminal bodies adjoin each other in said axial direction;
   wherein said first terminal body includes a plurality of axial projections extending in an axial direction outwardly from the first terminal body;
   wherein said second terminal body includes a plurality of recesses formed in a radial outer wall of said second terminal body;
   wherein said plurality of axial projections engage with form fit with said plurality of recesses such that meshing toothed connections between said first and second terminal bodies is realized for transmitting torque.

2. The filter module according to claim 1, wherein,
   in at least one of said two filter elements, a first one of said terminal bodies is connected by a second toothed connection to said support body for transmitting a torque from said first terminal body onto said support body and from said support body onto said first terminal body;
   wherein said support body has an end face that is facing said first terminal body;
   wherein said end face of said support body has a toothed crown extending in an axial direction towards said first terminal body;
   wherein said first terminal body has a side that is facing said support body;
   wherein said side of said first terminal body has a toothed counter crown that is matching said toothed crown;
   wherein said teeth of said toothed crown engage between teeth of said toothed counter crown forming said second toothed connection.

3. The filter module according to claim 1, wherein said first toothed connection is a snap connection.

* * * * *